June 20, 1961
O. STYRIE
2,989,144
METHOD OF AND APPARATUS FOR PURIFYING AND
DECONTAMINATING EXHAUST GASES
OF COMBUSTION DEVICES
Filed Dec. 27, 1956
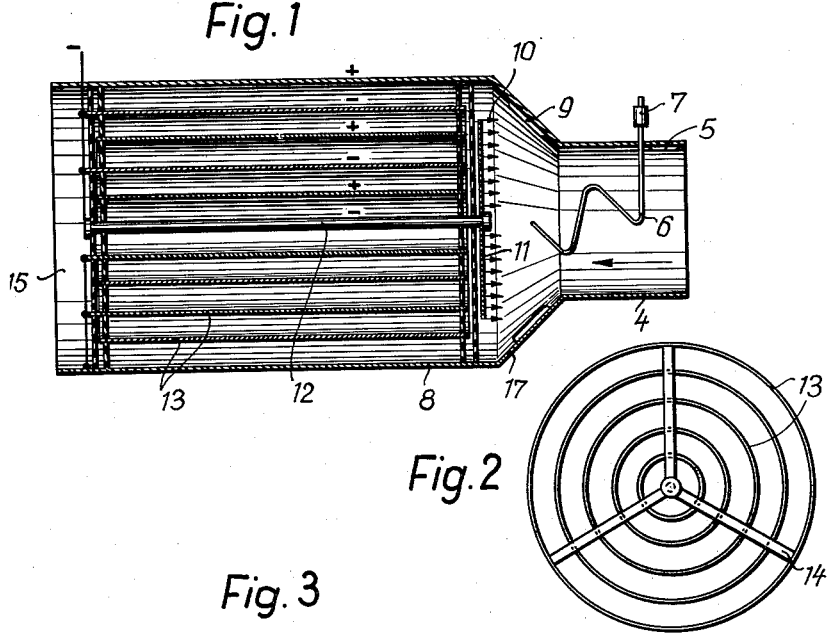
Fig. 1
Fig. 2
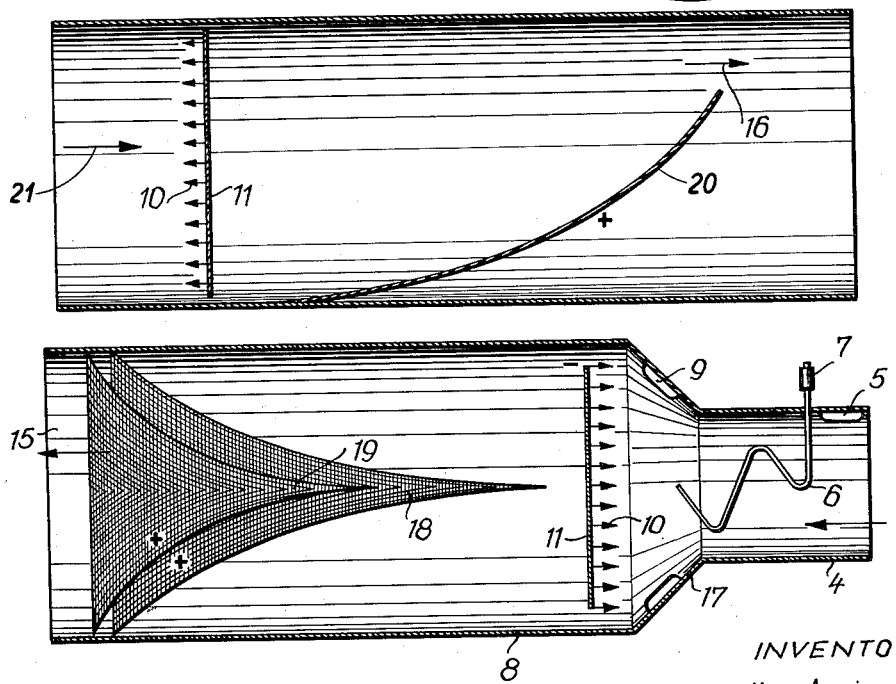
Fig. 3
Fig. 4
INVENTOR
Otto Styrie
by Michael S. Striker
Agent United States Patent Office 2,989,144
Patented June 20, 1961

2,989,144
METHOD OF AND APPARATUS FOR PURIFYING AND DECONTAMINATING EXHAUST GASES OF COMBUSTION DEVICES
Otto Styrie, 5 Weilerweg, Oberpleis, Germany
Filed Dec. 27, 1956, Ser. No. 630,808
Claims priority, application Germany Jan. 2, 1956
11 Claims. (Cl. 183—6)

This invention relates to a method of and apparatus for purifying and decontaminating exhaust gases of combustion devices, such as e.g. internal combustion engines, stoves, or the like.

For the separation of dust from air, gases or mixtures thereof, it is known to employ electrostatic dust collectors which consist substantially of corona discharge electrodes and collecting electrodes. The arrangement is such that any dust particles contained in the gaseous medium flowing through the charging zone of such electrostatic dust collector, are charged by ionization by impact, deflected from the direction of flow of the gaseous medium, passed to the collecting electrodes and deposited thereon. While an electrostatic dust collector of known type will remove from a gaseous medium any dust particles contained therein, it will not have any effect on the gaseous constituents of such medium. Thus, if the gas to be purified contains, for example, carbon monoxide, such toxic constituent will be left unaffected and passed into the open air.

To solve this problem it is, therefore, the object of the present invention to provide an efficient method of purifying and decontaminating exhaust gases of combustion devices, and apparatus for carrying out that method; which method comprises the steps of conducting the exhaust gases of a combustion device to a glowing, i.e. incandescent, means while admitting oxygen to said gases, and causing the resulting gas/oxygen mixture to oxydize.

The oxygen necessary for the oxydation of the gases may be introduced either in the form of atmospheric air entering through suitable inlet apertures provided in the duct conducting the gases from the combustion device to the purifying and decontaminating apparatus, or a corona discharge means may be utilized for the production of ozone which is then used for the oxydation of the gases. While the glowing means and the corona discharge means may be employed at the same time, it is also possible to use only one or the other. In each case the present method will decontaminate the exhaust gases and, for example, convert carbon monoxide into carbon dioxide by means of oxydation.

The apparatus for carrying out the method according to the invention comprises a duct connected to a combustion device for conducting exhaust gases escaping from said device, at least one air inlet in said duct, and a glowing means disposed within said duct and adapted to be connected to a source of electric energy.

The glowing means which may consist of an ordinary wire heating coil supplied by a battery, is preferably followed by a corona discharge spraying means which comprises a series of pointed members mounted on and electrically connected with a common support which is connected to high-voltage so as to charge electrostatically any non-gaseous particles contained in the exhaust gases, and to produce simultaneously ozone from the air contained in the mixture. The spraying means is preferably followed by a collecting electrode assembly. Such assembly may consist of tubes arranged concentrically one within the other and alternately connected to high-voltage and ground, respectively, or it may be in the form of at least one grounded, upwardly curved guide plate of substantially parabolic cross section, or even in the form of a grid comprising at least two interposed screen members connected to ground. In each case the arrangement is such that after all non-gaseous particles in the exhaust gases have been charged by the spraying means, the non-gaseous constituents will be forced to deposit on those collecting electrode members which are connected to ground so that the exhaust gases will leave the apparatus in a harmless, purified and decontaminated state.

While many other forms of construction are possible, three preferred embodiments of the invention are illustrated by way of example in the accompanying drawing in which:

FIG. 1 is a diagrammatic side elevational view of an apparatus for purifying and decontaminating exhaust gases of combustion devices;

FIG. 2 is an end view of the apparatus shown in FIG. 1;

FIG. 3 is a diagrammatic view of another form of construction of the apparatus according to the invention; and FIG. 4 shows, also in diagrammatic view, a further form of construction of the apparatus.

Referring now to FIG. 1 of the drawing, a socket or short pipe 4 is provided on one end of the apparatus for connection with a known combustion device (not shown), such as e.g. an internal combustion engine, stove or the like, so that the escaping exhaust gases will flow through the pipe 4 in the direction of the arrow. The pipe 4 has its circumferential surface provided with one or several air inlets 5 through which fresh air can enter the pipe 4 conducting the exhaust gases. The gases flowing through the pipe 4 come within the range of an incandescent or glowing means 6 which is connected to a battery 7 or similar source of energy. The glowing means may be an ordinary heating coil and serves for burning or oxydizing the exhaust gases upon the introduction of oxygen. The pipe 4 is connected to a conical intermediate member 17 which has on its periphery one or more air admission apertures 9 and merges into a cylindrical chamber 8 the diameter of which is considerably larger than that of the pipe 4. The intermediate member 17 is in its interior provided with a plurality of pointed members 10, such as e.g. needles, which are mounted on a common support 11 and have their points directed towards the pipe 4. The common support 11 is conncted to high-voltage (—) through the intermediary of a conductor pipe 12 which at the same time forms a carrier means for a number of tubes 13 of different diameter and arranged concentrically one within the other, as is shown best in FIG. 2. The tubes 13 are alternately connected to high-voltage (—) and ground (+) and securely held in position by insulating members 14 mounted on the conductor pipe 12 and extending radially therefrom.

Upon leaving the pipe 4 and the glowing means 6 disposed therein, the exhaust gases impinge upon the pointed members 10 constituting a spraying means discharging electrical energy whereby all non-gaseous particles suspended in the exhaust gases are charged. In passing on, the charged, non-gaseous constituents are thus forced to deposit on those tubes 13 which are connected to ground. After all toxic gases have been converted into harmless ones and the non-gaseous constituents have deposited on the ground connected tubes serving as collecting electrodes, the purified and decontaminated gases escape into the open air at 15.

Another construction of the apparatus is shown in FIG. 3. This simplified construction consists substantially of a housing 2 of preferably circular cross section, a spraying means extending transversely in said housing 2 and comprising a plurality of pointed members 10 mounted on a support 11, and one or more curved guide plates 20 within the housing 2. Here, the exhaust gases entering the housing in the direction of the arrow at 21, come into effective contact with the pointed members 10 whereby the non-gaseous constituents in the exhaust gases are charged and ozone is produced from the air contained therein. The curved guide plate 20 following the spraying means is connected to ground and has a substantially parabolic cross section so that the charged particles can impinge without substantial deflection on said curved plate 20 constituting a collecting electrode. The purified and decontaminated gases leave the apparatus in the direction of the arrow at 16.

A third form of construction of the apparatus is shown in FIG. 4, in which the exhaust gases enter the apparatus in the direction of the arrow shown in front of the glowing means 6, and are brought into effective contact with the pointed members 10, all of which is similar to the apparatus shown in FIG. 1. The spraying means formed by the pointed members 10 is followed by a grid consisting of at least two interposed screens 18 and 19 connected to ground. In passing through the apparatus the charged non-gaseous particles in the exhaust gases impinge on these screens 18, 19 acting as collecting electrode and deposit thereon while the purified gases flow through the meshes of the grid and leave the apparatus in the direction of the arrow at 15 to escape into the open air.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

I claim:

1. A process for the purification of an oxidizable combustion gas having non-gaseous particles suspended therein, comprising the steps of mixing said combustion gas with a gas containing molecular oxygen; subjecting the thus-formed mixture to an electric corona discharge so as to transform at least a portion of the molecular oxygen of said mixture into ozone, and to charge said suspended particles with static electricity, thereby causing reaction of said ozone with said oxidizable combustion gas at least partially oxidizing the latter; and thereafter passing the thus-formed gaseous mixture containing electrostatically charged particles through an electrostatic field so as to separate said charged particles from the at least partially oxidized combustion gas.

2. A process for the purification of an oxidizable combustion gas having non-gaseous particles suspended therein, comprising the steps of mixing said combustion gas with air as a gas containing molecular oxygen; subjecting the thus-formed mixture to an electric corona discharge so as to transform at least a portion of the molecular oxygen of said mixture into ozone, and to charge said suspended particles with static electricity, thereby causing reaction of said ozone with said oxidizable combustion gas at least partially oxidizing the latter; and thereafter passing the thus-formed gaseous mixture containing electrostatically charged particles through an electrostatic field so as to separate said charged particles from the at least partially oxidized combustion gas.

3. A process for the purification of an oxidizable combustion gas having non-gaseous particles suspended therein, comprising the steps of heating said combustion gas; mixing said heated combustion gas with air as a gas containing molecular oxygen; subjecting the thus-formed mixture to an electric corona discharge so as to transform at least a portion of the molecular oxygen of said mixture into ozone, and to charge said suspended particles with static electricity, thereby causing reaction of said ozone with said oxidizable combustion gas at least partially oxidizing the latter; and thereafter passing the thus-formed gaseous mixture containing electrostatically charged particles through an electrostatic field so as to separate said charged particles from the at least partially oxidized combustion gas.

4. A process for the purification of an oxidizable combustion gas having non-gaseous particles suspended therein, comprising the steps of heating said combustion gas by incandescent means; mixing said heated combustion gas with air as a gas containing molecular oxygen; subjecting the thus-formed mixture to an electric corona discharge so as to transform at least a portion of the molecular oxygen of said mixture into ozone, and to charge said suspended particles with static electricity, thereby causing reaction of said ozone with said oxidizable combustion gas at least partially oxidizing the latter; and thereafter passing the thus-formed gaseous mixture containing electrostatically charged particles through an electrostatic field so as to separate said charged particles from the at least partially oxidized combustion gas.

5. A process for the purification of an oxidizable combustion gas having non-gaseous particles suspended therein, comprising the steps of mixing said combustion gas with a gas containing molecular oxygen; subjecting the thus-formed mixture to an electric discharge so as to transform at least a portion of the molecular oxygen of said mixture into ozone, and to charge said suspended particles with static electricity, thereby causing reaction of said ozone with said oxidizable combustion gas at least partially oxidizing the latter; and thereafter passing the thus-formed gaseous mixture containing electrostatically charged particles through an electrostatic field so as to separate said charged particles from the at least partially oxidized combustion gas.

6. A device for the purification of an oxidizable combustion gas having non-gaseous particles suspended therein, comprising, in combination, duct means including a duct having opposite open end portions, one of said end portions communicating with a source of combustion gas for passage of the latter through said duct means, said duct being formed with an opening in a wall thereof spaced from said end portions for admission of molecular oxygen-containing gas is passing therethrough; electric discharge means arranged in said duct located between said opening and said other end portion for charging said suspended particles with static electricity and for transforming at least a portion of the molecular oxygen passing through said duct into ozone, whereby the thus-formed ozone will react with said oxidizable combustion gas at least partially oxidizing the same; and electrostatic collector means arranged in said duct between said electric discharge means and said other end portion and electrically charged for attracting said charged particles, whereby said particles are separated from said at least partially oxidized combustion gas.

7. A device for the purification of an oxidizable combustion gas having non-gaseous particles suspended therein, comprising, in combination, duct means including a duct having opposite open end portions, one of said end portions communicating with a source of combustion gas for passage of the latter through said duct means, said duct being formed with an opening in a wall thereof spaced from said end portions for admission of molecular oxygen-containing gas into said duct while said oxidizable combustion gas is passing therethrough; electric corona discharge means arranged in said duct located between said opening and said other end portion for charging said suspended particles with static electricity and for transforming at least a portion of the molecular oxygen passing through said duct into ozone, whereby the thus-formed ozone will react with said oxidizable combustion gas at least partially oxidizing the same; and electrostatic collector means arranged in said duct between said electric discharge means and said other end portion and electrically charged for attracting said charged particles, whereby said particles are separated from said at least partially oxidized combustion gas.

8. A device for the purification of an oxidizable combustion gas having non-gaseous particles suspended therein, comprising, in combination, duct means including a duct having opposite open end portions, one of said end portions communicating with a source of combustion gas for passage of the latter through said duct means, said duct being formed with an opening in a wall thereof spaced from said end portions for admission of molecular oxygen-containing gas into said duct while said oxidizable combustion gas is passing therethrough; heating means for heating combustion gas operatively connected with said duct between said one open end portion and said opening; electric discharge means arranged in said duct located between said heating means and said other end portion for charging said suspended particles with static electricity and for transforming at least a portion of the molecular oxygen passing through said duct into ozone, whereby the thus-formed ozone will react with said oxidizable combustion gas at least partially oxidizing the same; and electrostatic collector means arranged in said duct between said electric discharge means and said other end portion and electrically charged for attracting said charged particles, whereby said particles are separated from said at least partially oxidized combustion gas.

9. A device as set forth in claim 6, wherein said collector means includes a plurality of concentric tubular elements spaced and insulated from each other, said elements being electrically charged.

10. A device as set forth in claim 6, wherein said collector means includes a plurality of concentric tubular elements spaced and insulated from each other, adjacent elements being respectively charged to a high voltage and grounded.

11. A device as set forth in claim 6, wherein said collector means includes a baffle means electrically connected to ground and having a parabolic section in an axial plane of said duct means.

References Cited in the file of this patent

UNITED STATES PATENTS

| | | |
|---|---|---|
| 1,430,294 | Eddy et al. | Sept. 26, 1922 |
| 1,756,897 | Bilsky | Apr. 29, 1930 |
| 1,934,596 | Fogas | Nov. 7, 1933 |
| 2,005,249 | Tietig | June 18, 1935 |
| 2,195,431 | Shively et al. | Apr. 2, 1940 |
| 2,746,563 | Harlow | May 22, 1953 |
| 2,798,572 | Fields | July 9, 1957 |

FOREIGN PATENTS

| | | |
|---|---|---|
| 1,076,860 | France | Apr. 21, 1954 |

UNITED STATES PATENT OFFICE
CERTIFICATE OF CORRECTION

Patent No. 2,989,144  
June 20, 1961

Otto Styrie

It is hereby certified that error appears in the above numbered patent requiring correction and that the said Letters Patent should read as corrected below.

Column 4, line 40, after "gas" insert -- into said duct while said oxidizable combustion gas --.

Signed and sealed this 21st day of November 1961.

(SEAL)  
Attest:

ERNEST W. SWIDER  
Attesting Officer

DAVID L. LADD  
Commissioner of Patents  
USCOMM-DC